United States Patent
Aso

(10) Patent No.: US 7,583,520 B2
(45) Date of Patent: Sep. 1, 2009

(54) DIRECT-CURRENT CONVERTER

(75) Inventor: Shinji Aso, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 157 days.

(21) Appl. No.: 11/864,045

(22) Filed: Sep. 28, 2007

(65) Prior Publication Data
US 2008/0239768 A1 Oct. 2, 2008

(30) Foreign Application Priority Data
Nov. 22, 2006 (JP) ............................ 2006-315787

(51) Int. Cl.
*H02M 3/335* (2006.01)
(52) U.S. Cl. .......................... 363/25; 363/24
(58) Field of Classification Search ................. 363/16, 363/21.04, 24, 25, 56.06, 97, 131
See application file for complete search history.

(56) References Cited

U.S. PATENT DOCUMENTS

| | | | |
|---|---|---|---|
| 5,805,432 A * | 9/1998 | Zaitsu et al. | 363/16 |
| 6,166,927 A * | 12/2000 | Farrington et al. | 363/25 |
| 6,963,497 B1 * | 11/2005 | Herbert | 363/25 |
| 7,203,080 B2 * | 4/2007 | Aso et al. | 363/95 |

FOREIGN PATENT DOCUMENTS

JP 2003-319650 11/2003

OTHER PUBLICATIONS

U.S. Appl. No. 11/864,045, filed Sep. 28, 2007, Aso.
U.S. Appl. No. 12/100,765, filed Apr. 10, 2008, Aso.

* cited by examiner

*Primary Examiner*—Matthew V Nguyen
(74) *Attorney, Agent, or Firm*—Oblon, Spivak, McClelland, Maier & Neustadt, P.C.

(57) ABSTRACT

A direct-current converter includes a high-frequency converting circuit converting voltage of a direct-current power source to alternating-current voltage, a transformer having primary and secondary windings P, S and a rectification smoothing circuit rectifying and smoothing voltage induced in the secondary winding. This converting circuit includes other transformer having first and second windings n1, n2, switching element Q1 having a source connected to a negative pole of the power source and a drain connected to a positive pole thereof through winding n1, and switching element Q2 having a source connected to the negative pole of the power source and a drain connected to the positive pole thereof through winding n2, element Q2 being turned on/off alternately to element Q1 being turned on/off. Winding P is connected to a point between winding n1 and the drain of element Q1 and another point between winding n2 and the drain of element Q2.

10 Claims, 6 Drawing Sheets

DIRECT-CURRENT CONVERTER

BACKGROUND OF THE INVENTION

1. Field of the Invention

The present invention relates to a direct-current (D.C.) converter that is compact and inexpensive with high efficiency.

2. Description of Related Art

FIG. 1 shows a circuit diagram of a direct-current (D.C.) converter disclosed in Japanese Patent Publication Laid-open No. 2003-319650. In FIG. 1, this D.C. converter is formed by a half-bridge circuit. A series circuit consisting of a switching element Q1 (MOSFET) and a switching element Q2 (MOSFET) is connected to both ends of a direct-current (D.C.) power source Vin. In the switching element Q2, its drain is connected to a positive pole of the D.C. power source Vin. In the switching element Q1, its source of is connected to a negative pole of the D.C. power source Vin.

Between the source of the switching element Q1 and its drain, a diode D1 and a voltage resonant capacitor Cv are connected in parallel with the switching element Q1, respectively. Further, a series circuit including a reactor Lr, a primary winding P of a transformer T1 and a current-resonance capacitor Ci is connected to the drain and the source of the switching element Q1. The reactor Lr is formed by a leakage inductance between a primary side of the transformer T1 and its secondary side. A reactor Lp is connected to the primary winding P of the transformer T1 equivalently to its excitation inductance. Between the drain of the switching element Q2 and its source, a diode D2 is connected in parallel with the switching element Q2.

In the transformer T1, the secondary winding S has its one end (indicated with mark "●") connected to an anode of a diode D3 and a cathode of a diode D4. The diode D3 has its cathode connected to one end of a smoothing capacitor C4. The diode D4 has its anode connected to the other end of the capacitor C4.

In the transformer T1, the other end of the secondary winding S is connected to an anode of a diode D5 and a cathode of a diode D6. The diode D5 has its cathode connected to one end of the capacitor C4. The diode D6 has its anode connected to the other end of the capacitor C4. A load RL is connected to both ends of the capacitor C4.

In order to make an output voltage Vo from the capacitor C4 constant, a control circuit 10 alternately turns on/off the switching element Q1 and the switching element Q2 on the basis of an output voltage Vo from the capacitor C4, accomplishing PFM (Pulse Frequency Modulation) control.

Referring to a timing chart of FIG. 2, we now describe the operation of the conventional D.C. converter in prior art, in detail.

In FIG. 2, $V_{ds1}$ designates a voltage between the drain and the source of the switching element Q1, $I_{d1}$ a drain current of the switching element Q1, $I_{D1}$ a current of the diode D1, $V_{ds2}$ a voltage between the drain and the source of the switching element Q2, $I_{d2}$ a drain current of the switching element Q2, $I_{D2}$ a current of the diode D2, $V_{Cv}$ a voltage at both ends of the voltage resonant capacitor Cv, $I_{Cv}$ a current of the voltage resonant capacitor Cv, $I_{Lr}$ a current of the reactor Lr, $I_{Lp}$ a current of the reactor Lp, $V_{Ci}$ a voltage at both ends of the voltage resonant capacitor Ci, $I_{D3}$ a current of the diode D3, and $I_{D5}$ designates a current of the diode D5.

In the operation, it is noted that the switching element Q1 and the switching element Q2 are turned ON/OFF alternately to each other while containing a dead time when the switching element Q1 and the switching element Q2 are turned OFF together.

Within a period between t0 and t1, the state of the switching element Q1 is changed from ON-state to OFF state at t0. In a situation where the switching element Q1 is being turned ON, current flows in the route of Ci→Lp→Lr→Q1→Ci on the primary side of the transformer T1, while current flows in the route of C4→RL→C4 on the secondary side of the transformer T1. When the switching element Q1 is turned OFF, the current that had been flowing on the primary side of the transformer T1 is commutated from the switching element Q1 to the voltage resonant capacitor Cv, so that the current flows in the route of Ci→Lp→Lr→Cv→Ci.

As a result, the voltage resonant capacitor Cv is charged up to a voltage of the D.C. power source Vin although the voltage of the voltage resonant capacitor Cv had been exhibiting 0V while the switching element Q1 had been being turned ON. In connection, the voltage of the D.C. power source Vin will be also indicated with "Vin", hereinafter. Thus, as the voltage $V_{Cv}$ of the voltage resonant capacitor Cv is equal to the voltage $V_{ds1}$ of the switching element Q1, the voltage $V_{ds1}$ of the switching element Q1 rises from 0V to Vin. Correspondingly, the voltage $V_{ds2}$ of the switching element Q2 falls from Vin to 0V as the voltage $V_{ds2}$ of the switching element Q2 is equal to a difference of $(Vin-V_{Cv})$.

In the period between t1 and t2, when the voltage $V_{Cv}$ of the voltage resonant capacitor Cv rises to Vin at time t1, the diode D2 becomes conductive, so that current flows in the route of Ci→Lp (P)→Lr→D2→Vin→Ci. Then, the voltage of the secondary winding S of the transformer T1 reaches the output voltage Vo, so that there arise two current flows in the route of C4→RL→C4 and the route of S→D3→C4→D6→S on the secondary side of the transformer T1. Further, since a gate signal for the switching element Q2 is outputted during the period between t1 and t2, the switching element Q2 carries out both zero-voltage switching (ZVS) operation and zero-current switching (ZVC) operation.

During the period between t2 and t3, there arises a current flow in the route of Vin→Q2→Lr→Lp (P)→Ci→Vin since the switching element Q2 has been turned ON at t2, so that the voltage $V_{Ci}$ of the capacitor Ci rises with time. Then, on the secondary side of the transformer T1, there arise two current flows in the route of S→D3→C4→D6→S and the route of C4→RL→C4. It is noted that the voltage of the secondary winding S is clamped at the output voltage Vo, while the voltage of the primary winding P is clamped at a voltage in the turn ratio of the transformer T1 to the output voltage Vo. Therefore, resonant current due to the reactor Lr and the current resonant capacitor Ci is flowing on the primary side of the transformer T1.

In the period between t3 and t4, as the voltage of the secondary winding S becomes less than the output voltage Vo at t3, there arises a current flow in the route of C4→RL→C4 on the secondary side of the transformer T1. While, on the primary side of the transformer T1, the current flows in the route of Vin→Q2→Lr→Lp→Ci→Vin. That is, on the primary side of the transformer T1, there arises a flow of resonant current by the sum (Lr+Lp) of two reactors Lr, Lp and the current resonant capacitor Ci.

In the period from between t4 and t5, when the switching element Q2 is turned OFF at t4, the current flowing on the primary side of the transformer T1 is commutated from the switching element Q2 to the voltage resonant capacitor Cv, so that the current flows in the route of Lr→Lp→Ci→Cv→Lr.

Accordingly, the voltage resonant capacitor Cv, whose voltage has been equal to approx. Vin while the switching element Q2 is being turned ON, is discharged to approx. 0V. Thus, as the voltage $V_{Cv}$ of the voltage resonant capacitor Cv is equal to the voltage $V_{ds1}$ of the switching element Q1, the same voltage $V_{ds1}$ falls from Vin to 0V. Correspondingly, the voltage $V_{ds2}$ of the switching element Q2 rises from 0V to Vin as the voltage $V_{ds2}$ of the switching element Q2 is equal to a difference of (Vin−$V_{Cv}$).

In the period between t5 and t6, when the voltage $V_{Cv}$ of the voltage resonant capacitor Cv falls to 0V at t5, the diode D1 becomes conductive, so that current flows in the route of Lr→Lp (P)→Ci→D1→Lr. Then, the voltage of the secondary winding S of the transformer T1 reaches the output voltage Vo, so that there arise two current flows in the route of C4→RL→C4 and the route of S→D5→C4→D4→S on the secondary side of the transformer T1. Further, since a gate signal for the switching element Q1 is outputted during the period between t5 and t6, the switching element Q1 carries out both zero-voltage switching (ZVS) operation and zero-current switching (ZVC) operation.

During the period between t6 and t7, there arises a current flow in the route of Ci→Lp (P)→Lr→Q1→Ci since the switching element Q1 has been turned ON at t6, so that the voltage $V_{Ci}$ of the capacitor Ci decreases with time. On the other hand, on the secondary side of the transformer T1, there are two current flows in the route of S→D5→C4→D4→S and the route of C4→RL→C4. The voltage of the secondary winding S is clamped at the output voltage Vo, while the voltage of the primary winding P is clamped at a voltage in the turn ratio of the transformer T1 to the output voltage Vo. Thus, resonant current due to the reactor Lr and the current resonant capacitor Ci is flowing on the primary side of the transformer T1.

In the period between t7 and t8, as the voltage of the secondary winding S becomes less than the output voltage Vo at t7, there arises a current flow in the route of C4→RL→C4 on the secondary side of the transformer T1. While, on the primary side of the transformer T1, the current flows in the route of Ci→Lp→Lr→Q1→Ci. That is, on the primary side of the transformer T1, there arises a flow of resonant current by the sum (Lr+Lp) of two reactors Lr, Lp and the current resonant capacitor Ci.

SUMMARY OF THE INVENTION

In this way, the conventional D.C. converter of FIG. 1 controls the switching frequency between the switching element Q1 and the switching element Q2 with the use of pulse signals having a duty ratio of approx. 50%. With the control of the switching frequency, it allows a resonant current due to the reactors Lr, Lp and the current resonant capacitor C1 to be altered and consequently, the output voltage Vo can be controlled. Therefore, if raising the switching frequency, then the output voltage Vo is lowered.

In the converter of FIG. 1, additionally, its driving circuit is complicated due to the structure where respective source potentials (voltages) for the switching elements Q1, Q2 are different from each other. Again, if the input voltage Vin is small, then the resonant current on the primary side of the transformer T1 increases, so that currents flowing in the reactor Lr and the current resonant capacitor Ci in the resonant circuit get larger correspondingly. Assume, the D.C power source Vin is provided with 20V, while the load RL consumes a power of 100V and 1 A. In such a case, there arise a resonant current of 5 A when the switching element Q1 is turned ON and a resonant current of 5 A when the switching element Q2 is turned ON, so that the resonant current of 10 A in total flows in the resonant circuit.

Therefore, if the input voltage is small, losses at the reactor Lr and the current resonant capacitor Ci grow larger to cause a deterioration in the efficiency of the D.C. converter. Alternatively, components for the reactor Lr and the current resonant condenser Ci become larger to cause the D.C. converter to be large-sized disadvantageously.

Under the above-mentioned situation, an object of the present invention is to provide a direct-current converter which includes two switching elements whose reference potentials (source potentials) are in common with each other to simplify a driving circuit and which is compact and inexpensive with high efficiency in spite of small input voltage.

In order to solve the above-mentioned problem, according to a main aspect of the present invention, there is provided a direct-current converter comprising: a high-frequency converting circuit that converts a direct-current voltage of a direct-current power source to a high-frequency alternating-current voltage; a first transformer having a primary winding and a secondary winding; and a rectification smoothing circuit that rectifies and smoothens a voltage induced in the secondary winding of the first transformer to pick up a direct-current output, wherein the high-frequency converting circuit includes a second transformer having a first winding and a second winding, a first switching element having a first main electrode connected to a negative pole of the direct-current power source and a second main electrode connected to a positive pole of the direct-current power source through the first winding of the second transformer, and a second switching element having a third main electrode connected to the negative pole of the direct-current power source and a fourth main electrode connected to the positive pole of the direct-current power source through the second winding of the second transformer, the second switching element being turned on/off alternately to the first switching element being turned on/off, and the primary winding of the first transformer is connected to one connection point between the first winding of the second transformer and the second main electrode of the first switching element and another connection point between the second winding of the second transformer and the fourth main electrode of the second switching element.

DETAILED DESCRIPTION OF THE PREFERRED EMBODIMENTS

Various embodiments of a direct-current converter of the present invention will be described with reference to drawings, below in detail.

1st. Embodiment

Figure 3:
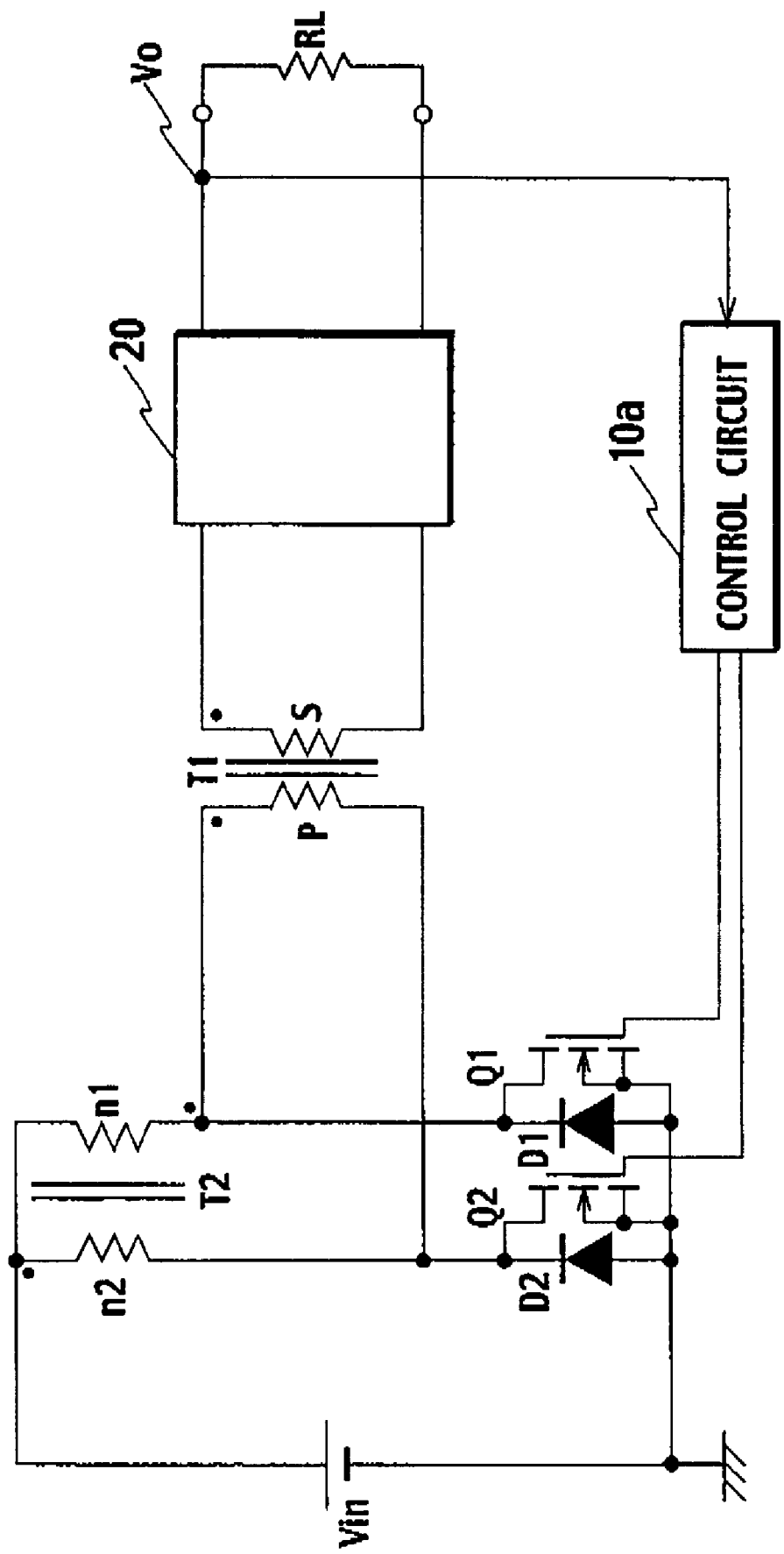
FIG. 3 is a circuitry diagram showing a direct-current converter in accordance with a first embodiment of the present invention.

FIG. 3 is a circuitry diagram showing the direct-current (D.C.) converter in accordance with the first embodiment of the present invention. FIG. 3 also illustrates a conceptual constitution of the D.C. converter of the first embodiment. In brief, the D.C. converter includes a second transformer including a first winding and a second winding. In the D.C. converter, a reference voltage (reference potential) for a first switching element is established so as to be in common with a reference voltage for a second switching element. With the constitution, by exciting a primary winding of a first transformer with a voltage amplitude that is four times as much as a voltage of a direct-current (D.C.) power source, a current flowing in the primary winding is reduced to a quarter of current flowing in the conventional "half-bridge" circuit. With such features, a compact and inexpensive D.C. converter can be provided with high-efficiency performance.

In the D.C. converter of FIG. 3, the transformer T2 includes a first winding n1 and a second winding n2 electromagnetically coupled to the first winding n1. The D.C. converter further includes a switching element Q1 made from MOSFET and a switching element Q2 made from MOSFET. In the switching element Q1, its source (source pole) is connected to a negative pole (reference potential) of the D.C. power source Vin, while a drain (drain pole) of the element Q1 is connected to a positive pole of the D.C. power source Vin through the intermediary of the first winding n1 of the transformer T2. In the switching element Q2, its source (source pole) is connected to the negative pole of the D.C. power source Vin, while a drain (drain pole) of the element Q2 is connected to a the positive pole of the D.C. power source Vin through the intermediary of the second winding n2 of the transformer T2.

Between the drain and the source of the switching element Q1, a diode D1 is connected in parallel with the switching element Q1. Similarly, between the drain and the source of the switching element Q2, a diode D2 is connected in parallel with the switching element Q1.

A transformer T1 is provided with a primary winding P and a secondary winding S. The primary winding P is connected, at both ends thereof, to a connection point between the first winding n1 of the transformer T2 and the drain of the switching element Q1 and another connection point between the second winding n2 of the transformer T2 and the drain of the switching element Q2.

All of the transformer T2, the switching element Q1 and the switching element Q2 form a high-frequency converting circuit that converts direct-current voltage of the D.C. power source Vin to high-frequency alternating-current (A.C) voltage. The so-converted high-frequency A.C. voltage is impressed on the primary winding P of the transformer T1. A rectification smoothing circuit 20 rectifies and smoothens voltage induced in the secondary winding S of the transformer T1 and supplies a resistance RL with direct-current (D.C) output.

A control circuit 10a allows the switching element Q1 and the switching element Q2 to be turned ON/OFF alternately to each other upon changing an oscillating frequency on the basis of an output voltage Vo of the rectification smoothing circuit 20. That is, the control circuit 10a controls the operation (ON/OFF) of the switching elements Q1, Q2 under pulse frequency modulation (PFM) control.

The operation of the D.C. converter of the first embodiment will be described below. Note that the principle of picking up the output voltage Vo from the transformer T1 is similar to that of the conventional D.C. converter described with reference to FIGS. 1 and 2. Thus, we are concerned here only with the reason why four times as much voltage as the voltage Vin of the D.C. power source is generated between both ends of the primary winding P of the transformer T1.

In the high-frequency converter circuit of FIG. 3 (including the transformer T2, the switching element Q1 and the switching element Q2), the switching element Q1 and the switching element Q2 repeat their ON/OFF states alternately to each other while interposing a "dead-time" period when these elements Q1, Q2 are turned OFF together.

When the switching element Q1 is turned ON while the switching element Q2 is turned OFF, the transformer T1 is provided, at one end (●: on the winding-start side) of the primary winding P, with a potential of GRD (as the reference potential). Then, the transformer T2 is provided, at one end (no mark: on the winding-end side) of the first winding n1, with a positive voltage. That is, the voltage Vin of the D.C. power source is impressed on the same end (on the winding-end side) of the first winding n1 of the transformer T2.

Accordingly, the transformer T2 has a positive voltage at one end (no mark: on the winding-end side) of the second winding n2, generating the voltage Vin of the D.C. power source. In the transformer T1, consequently, the sum of the voltage Vin of the D.C. power source and the above voltage generated in the second winding n2 of the transformer T2 is impressed on the other end (no mark: on the winding-end side) of the primary winding P. In brief, twice (i.e. 2Vin) as much voltage as the voltage Vin of the D.C. power source is impressed on the winding-end side of the primary winding P of the transformer T1.

Next, when the switching element Q1 is turned OFF while the switching element Q2 is turned ON, the transformer T1 is provided, at the end (no mark: on the winding-end side) of the primary winding P, with a potential of GRD (reference potential). Then, the transformer T2 has a positive voltage at the end (●: on the winding-start side) of the second winding n2 of the second transformer T2. Thus, the voltage Vin of the D.C. power source is impressed on the above end of the second winding n2 of the transformer T2.

Accordingly, the transformer T2 has a positive voltage at one end (●: on the winding-start side) of the first winding n1, generating the voltage Vin of the D.C. power source. In the transformer T1, consequently, the sum of the voltage Vin of the D.C. power source and the above voltage generated in the first winding n1 of the transformer T2 is impressed on the other end (●: on the winding-start side) of the primary winding P. In brief, twice (i.e. 2Vin) as much voltage as the voltage Vin of the D.C. power source is impressed on the winding-start side of the primary winding P of the transformer T1. Accordingly, during the total of one period when the switching element Q1 is being turned ON and another period when the switching element Q1 is being turned OFF, the primary winding P of the transformer T1 can be excited four times as much voltage amplitude as the voltage Vin of the D.C. power source.

Figure 1:
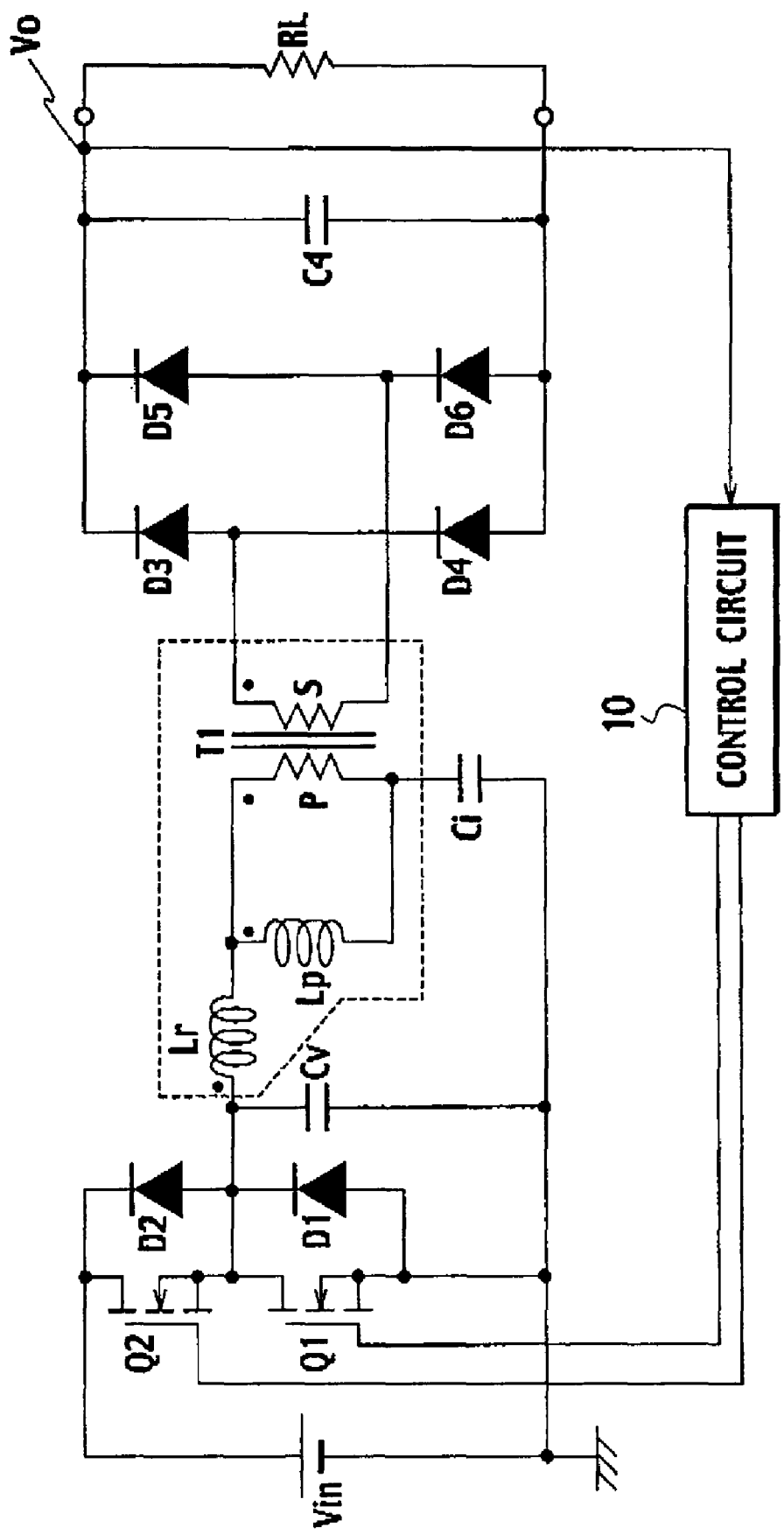
FIG. 1 is a circuitry diagram showing a direct-current converter in prior art.

Thus, according to the first embodiment shown in FIG. 3, the high-frequency A.C. voltage impressed on the primary winding P of the transformer T1 is four times as much as that in the prior art of FIG. 1, while the current flowing in the primary winding P becomes a quarter of that in the prior art of FIG. 1. In other words, it is possible to provide a compact D.C. converter that could convert the voltage of the D.C. power source with high efficiency even if the voltage is small. Additionally, as the reference potentials (source potentials) of the switching elements Q1, Q2 are in common with each other, the driving circuit can be simplified to provide a D.C. converter which is compact, high in effectiveness and low in price.

2nd. Embodiment

Figure 4:
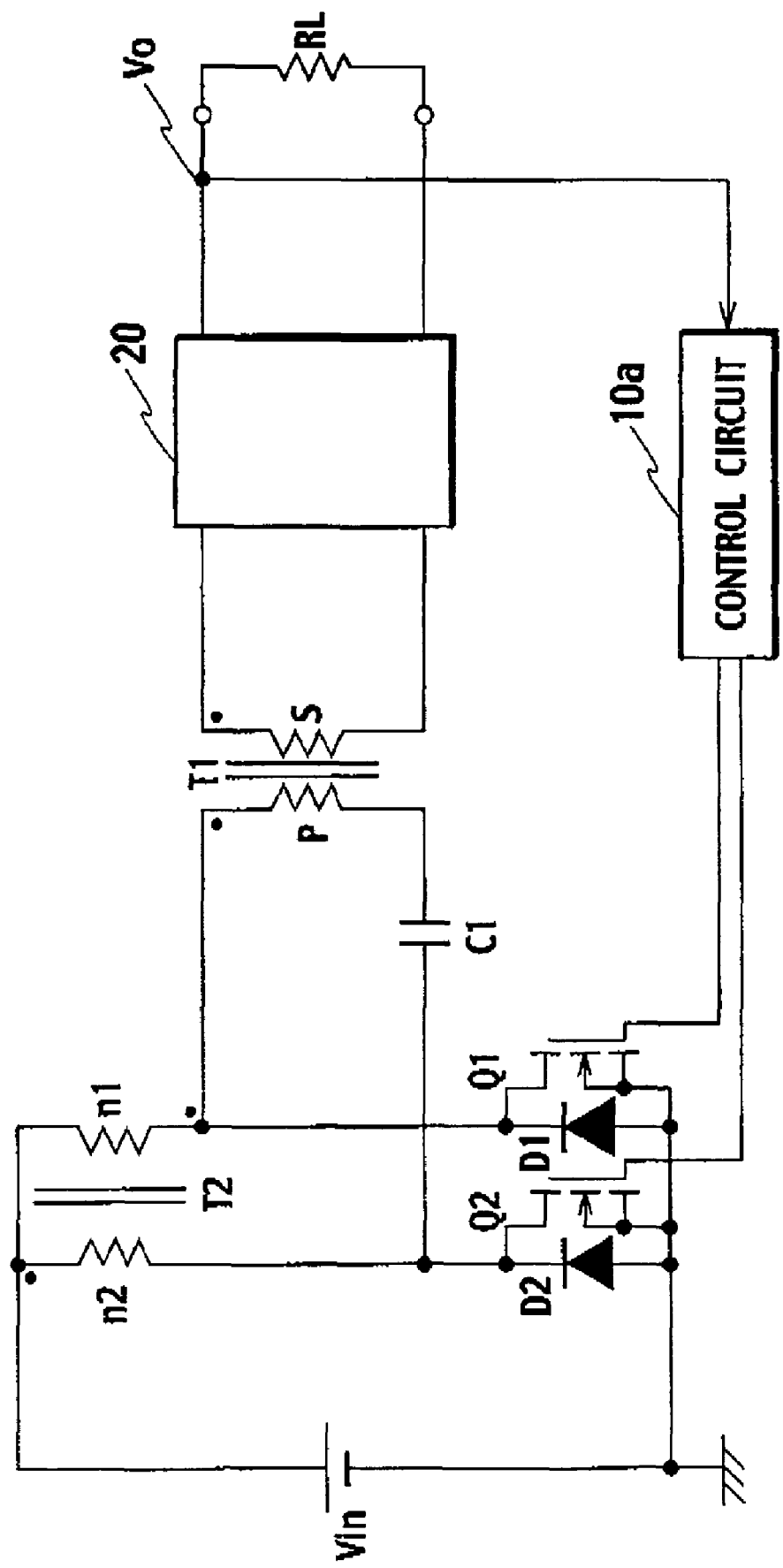
FIG. 4 is a circuitry diagram showing a direct-current converter in accordance with a second embodiment of the present invention.

FIG. 4 is a circuitry diagram showing a direct-current (D.C.) converter in accordance with the second embodiment of the present invention. This D.C. converter differs from the above-mentioned D.C. converter in that a series resonant circuit composed of the primary winding P of the transformer T1 and a capacitor C1 is interposed between one connection point between the first winding n1 of the transformer T2 and the drain of the switching element Q1 and another connection point between the second winding n2 of the transformer T2 and the drain of the switching element Q2.

In spite of the above difference, the operation of the D.C. converter of the second embodiment is similar to that of the D.C. converter of the first embodiment, allowing the similar effect to be afforded.

3rd. Embodiment

Figure 5:
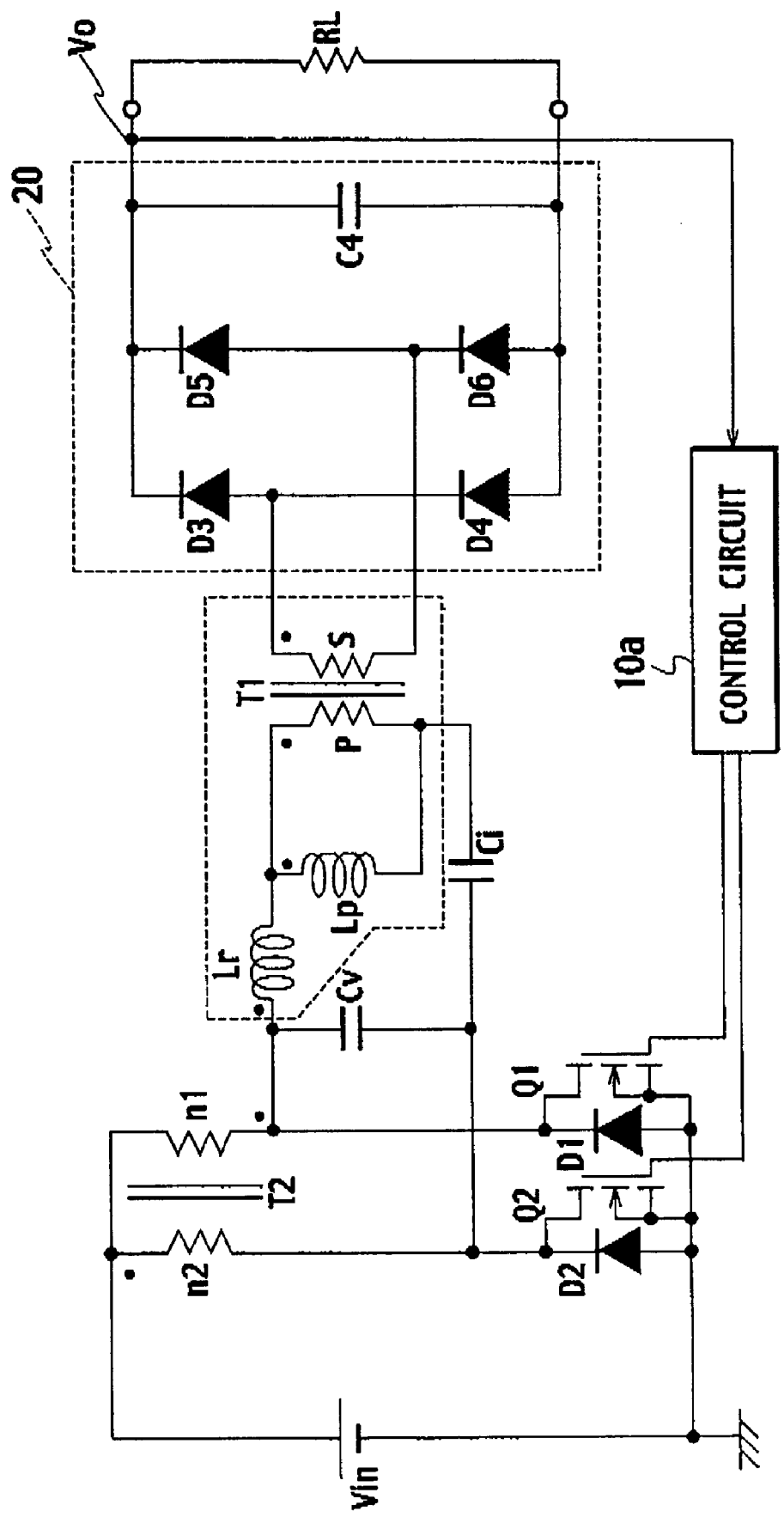
FIG. 5 is a circuitry diagram showing a direct-current converter in accordance with a third embodiment of the present invention.

FIG. 5 is a circuitry diagram showing a direct-current (D.C.) converter in accordance with the third embodiment of the present invention. In the D.C. converter of the third embodiment, a voltage resonant capacitor Cv is connected in parallel with the connection point between the first winding n1 of the transformer T2 and the drain of the switching element Q1 and the connection point between the second winding n2 of the transformer T2 and the drain of the switching element Q2. Further, the D.C. converter includes a series resonant circuit where the primary winding P of the transformer T1, a current resonant capacitor Ci and a reactor Lr are connected with each other, in series. This series resonant circuit is connected in parallel with the former connection point and the latter connection point. The reactor Lr is formed by a leakage inductance between the primary side and the secondary side of the transformer T1. A reactor Lp is connected in parallel with the primary winding P of the transformer T1 equivalently to its excitation inductance.

This D.C. converter is also provided, on the secondary side of the transformer T1, with a rectification smoothing circuit 20. The rectification smoothing circuit 20 has a structure identical to that of the rectification smoothing circuit on the secondary side of the transformer T1 of the conventional D.C. converter described with reference to FIG. 1. Therefore, we delete the detailed explanation of the rectification smoothing circuit 20.

In the third embodiment of FIG. 5, a high-frequency voltage switched by the switching element Q1 and the switching element Q2 is impressed on the series resonant circuit having the primary winding P, the current resonant capacitor Ci and the reactor Lr, while a voltage generated in the secondary winding S of the transformer T1 is smoothened by the rectification smoothing circuit 20. That is, a difference between the D.C. converter of the third embodiment of FIG. 5 and the conventional D.C. converter of FIG. 1 resides in only the method of switching D.C. voltage of the D.C. power source at high frequency. The D.C. converter of this embodiment is characterized by the possibility of exciting the series resonant circuit four times as much voltage amplitude as the voltage of the D.C. power source.

The operation of the D.C. converter of the third embodiment will be described with reference to a timing chart of FIG. 6.

Figure 2:
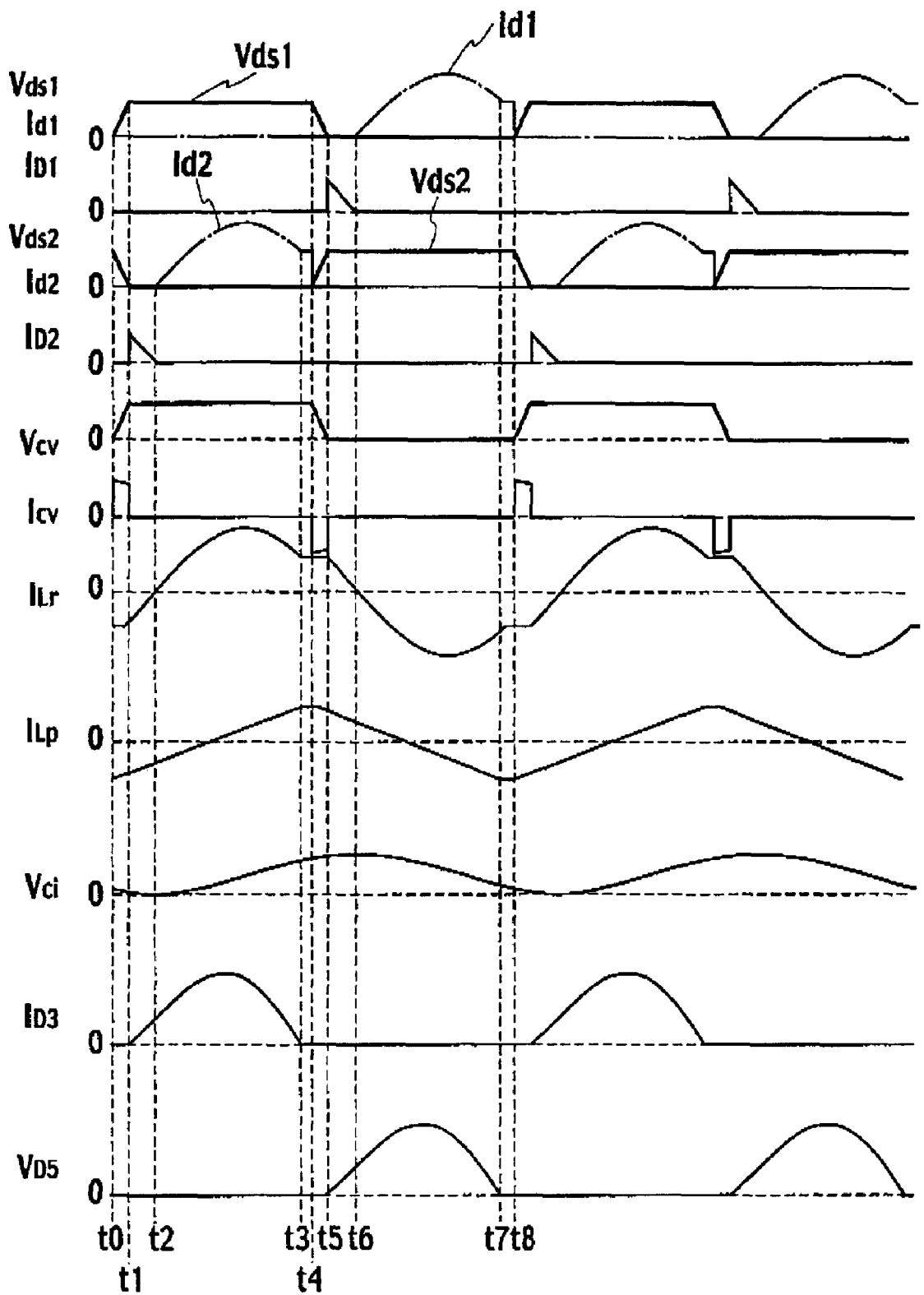
FIG. 2 is a timing chart of signals of respective parts of the direct-current converter of FIG. 1.
Figure 6:
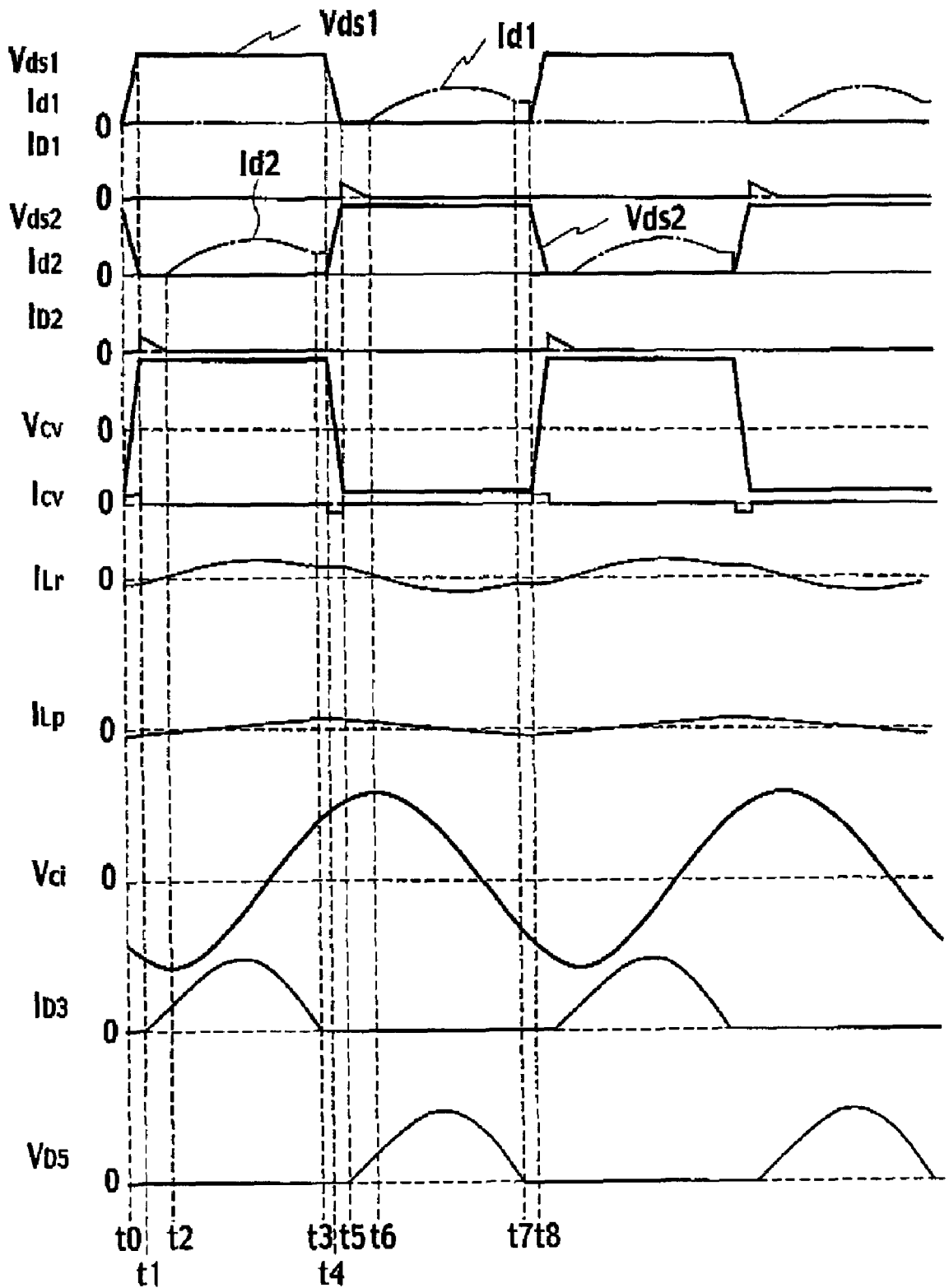
FIG. 6 is a timing chart of signals of respective parts of the direct-current converter in accordance with the third embodiment of the present invention.

In connection, as various voltages and currents shown in FIG. 6 correspond to those shown in FIG. 2 respectively, their explanations are eliminated. In this embodiment also, the switching element Q1 and the switching element Q2 are turned ON/OFF alternately to each other while interposing a "dead time" when the switching element Q1 and the switching element Q2 are together turned OFF.

Within the period between t0 and t1, the state of the switching element Q1 is changed from ON-state to OFF state at t0. In a situation where the switching element Q1 is being turned ON, currents $I_{Lr}$, $I_{Lp}$ of i/4 flow in the route of Ci→Lp→Lr→Q1→Vin→n2→Ci on the primary side of the transformer T1. Here, it is noted that "i" corresponds to the currents $I_{Lr}$, $I_{Lp}$ in the prior art D.C. converter of FIG. 1. Further, current of i/4 flows in the route of Vin→n1→Q1→Vin. As a result, current $I_{d1}$ of i/2 flows in the switching element Q1. Note that this current $I_{d1}$ is one half as much as the current $I_{d1}$ of FIG. 2. On the other hand, current also flows in the route of C4→RL→C4 on the secondary side of the transformer T1.

When the switching element Q1 is turned OFF, the current that had been flowing on the primary side of the transformer T1 is commutated from the switching element Q1 to the voltage resonant capacitor Cv, so that the current flows in the route of Ci→Lp→Lr→Cv→Ci.

As a result, the voltage resonant capacitor Cv is charged up to a voltage of +2Vin although the voltage of the voltage resonant capacitor Cv had been exhibiting nearly −2Vin while the switching element Q1 had been being turned ON. Thus, the voltage $V_{ds1}$ of the switching element Q1 rises from 0V to +2Vin. In connection, the voltage $V_{ds2}$ decreases from +2Vin to 0V.

In the period between t1 and t2, when the voltage $V_{Cv}$ of the voltage resonant capacitor Cv rises to +2Vin at t1, the diode D2 becomes conductive, so that the current $I_{D2}$ flows in the route of Ci→Lp (P)→Lr→n1→Vin→D2→Ci. Then, the voltage of the secondary winding S of the transformer T1 reaches the output voltage Vo, so that there arise two current flows in the route of C4→RL→C4 and the route of S→D3→C4→D6→S on the secondary side of the transformer T1. Further, since a gate signal for the switching element Q2 is outputted during the period between t1 and t2, the switching element Q2 carries out both zero-voltage switching (ZVS) operation and zero-current switching (ZVC) operation.

During the period between t2 and t3, the current $I_{Lr}$, $I_{Lp}$ of i/4 flows in the route of Vin→n1→Lr→Lp (P)→Ci→Q2→Vin since the switching element Q2 has been turned ON at t2. Further, the current of i/4 flows in the route of Vin→n2→Q2→Vin. As a result, the current $I_{d2}$ of i/2 flows in the switching element Q2. This current $I_{d2}$ is one half as much as the current $I_{d2}$ of FIG. 2.

In this way, the voltage $V_{Ci}$ of the current resonant capacitor Ci rises with time. This voltage $V_{Ci}$ is four times as much as the voltage $V_{Ci}$ of FIG. 2. On the other hand, on the secondary side of the transformer T1, there are two current flows in the route of S→D3→C4→D6→S and the route of C4→RL→C4. Here, it is noted that the voltage of the secondary winding S is clamped at the output voltage Vo, while the voltage of the primary winding P is clamped at a voltage in the turns ratio of the transformer T1 to the output voltage Vo. Therefore, resonant current due to the reactor Lr and the current resonant capacitor Ci is flowing on the primary side of the transformer T1.

In the period between t3 and t4, as the voltage of the secondary winding S becomes less than the output voltage Vo at t3, there arises a current flow in the route of C4→RL→C4 on the secondary side of the transformer T1. While, on the primary side of the transformer T1, the current flows in the route of Vin→n1→Lr→Lp→Ci→Q2→Vin. That is, on the primary side of the transformer T1, there arises a flow of resonant current by the sum (Lr+Lp) of two reactors Lr, Lp and the current resonant capacitor Ci.

In the period between t4 and t5, when the switching element Q2 is turned OFF at t4, the current flowing on the primary side of the transformer T1 is commutated from the switching element Q2 to the voltage resonant capacitor Cv, so that the current flows in the route of Lr→Lp→Ci→Cv→Lr.

Accordingly, the voltage of the voltage resonant capacitor Cv, which has been equal to approx. +2Vin while the switching element Q2 is being turned ON, falls from approx. +2Vin to approx. −2Vin. Correspondingly, the voltage of the switching element Q1 falls from 2Vin to 0V. Further, the voltage $V_{ds2}$ of the switching element Q2 rises from 0V to 2Vin.

In the period between t5 and t6, when the voltage $V_{Cv}$ of the voltage resonant capacitor Cv falls to −2Vin at t5, the diode D1 becomes conductive, so that the current $I_{D1}$ flows in the route of Lr→Lp (P)→Ci→n2→Vin→D1→Lr. Then, the voltage of the secondary winding S of the transformer T1 reaches the output voltage Vo, so that there arise two current flows in the route of C4→RL→C4 and the route of S→D5→C4→D4→S on the secondary side of the transformer T1.

Further, since the gate signal for the switching element Q1 is outputted during the period between t5 and t6, the switching element Q1 carries out both zero-voltage switching (ZVS) operation and zero-current switching (ZVC) operation.

During the period between t6 and t7, since the switching element Q1 is turned ON at t6, the currents $I_{Lr}$, $I_{Lp}$ of i/4 flows in the route of Ci→Lp (P)→Lr→Q1→Vin→n2→Ci. Further, the current of i/4 flows in the route of Vin→n1→Q1→Vin. Correspondingly, the voltage $V_{Ci}$ of the current resonant capacitor Ci decreases with time. On the other hand, on the secondary side of the transformer T1, there are two current flows in the route of S→D5→C4→D4→S and the route of C4→RL→C4. As mentioned above, the voltage of the secondary winding S is clamped at the output voltage Vo, while the voltage of the primary winding P is clamped at a voltage in the turn ratio of the transformer T1 to the output voltage Vo. Thus, resonant current due to the reactor Lr and the current resonant capacitor Ci is flowing on the primary side of the transformer T1.

In the period between t7 and t8, as the voltage of the secondary winding S becomes less than the output voltage Vo at time t7, there arises a current flow in the route of C4→RL→C4 on the secondary side of the transformer T1. While, on the primary side of the transformer T1, the current flows in the route of Ci→Lp→Lr→Q1→Vin→n2→Ci. That is, on the primary side of the transformer T1, there arises a flow of resonant current by the sum (Lr+Lp) of two reactors Lr, Lp and the current resonant capacitor Ci.

From above, in the D.C. converter of the third embodiment, each of the voltages $V_{Ci}$, $V_{Cv}$ becomes four times as much as that of the conventional D.C. converter, while each of the currents $I_{Lr}$, $I_{Lp}$ becomes a quarter of that of the conventional D.C. converter. Similarly, each of the voltages $V_{ds1}$, $V_{ds2}$ becomes twice as much as that of the conventional D.C. converter, while each of the currents $I_{d1}$, $I_{d2}$ becomes one half of that of the conventional D.C. converter.

As mentioned above, according to the present invention, the first switching element has the first main electrode connected to the negative pole of the direct-current power source and the second main electrode connected to the positive pole of the direct-current power source through the first winding of the second transformer, while the second switching element has the third main electrode connected to the negative pole of the direct-current power source and the fourth main electrode connected to the positive pole of the direct-current power source through the second winding of the second transformer. Further, the primary winding of the first transformer is connected to one connection point between the first winding of the second transformer and the second main electrode of the first switching element and another connection point between the second winding of the second transformer and the fourth main electrode of the second switching element. Therefore, the voltage impressed on the primary winding of the first transformer becomes four times as much as that of the conventional D.C. converter, while the current flowing in the primary winding of the first transformer becomes a quarter of that of the conventional D.C. converter. Accordingly, it is possible to provide a high-efficiency and inexpensive D.C. converter even when the voltage of the D.C. power source is small.

Additionally, as the first main electrode and the third main electrode of two switching elements are connected to the negative pole of the D.C. power source, the reference potentials of these switching elements become common with each other. As a result, the driving circuit of the D.C. converter is simplified to construct a compact D.C. converter.

The present invention is applicable to a power source circuit of a D.C./D.C. converter and that of an A.C./D.C. converter or the like.

Finally, it will be understood by those skilled in the art that the foregoing descriptions are nothing but three embodiments of the disclosed D.C. converter and therefore, various changes and modifications may be made within the contents of the present invention.

This application is based upon the Japanese Patent Application No. 2006-315787, filed on Nov. 22, 2006, the entire content of which is incorporated by reference herein.

What is claimed is:
1. A direct-current converter comprising:
a high-frequency converting circuit that converts a direct-current voltage of a direct-current power source to a high-frequency alternating-current voltage;
a first transformer having a primary winding and a secondary winding; and
a rectification smoothing circuit that rectifies and smoothens a voltage induced in the secondary winding of the first transformer to pick up a direct-current output, wherein
the high-frequency converting circuit includes a second transformer having a first winding and a second winding, a first switching element having a first main electrode connected to a negative pole of the direct-current power source and a second main electrode connected to a positive pole of the direct-current power source through the first winding of the second transformer, and a second switching element having a third main electrode connected to the negative pole of the direct-current power source and a fourth main electrode connected to the positive pole of the direct-current power source through the second winding of the second transformer, the second switching element being turned on/off alternately to the first switching element being turned on/off, and
the primary winding of the first transformer is connected to one connection point between the first winding of the second transformer and the second main electrode of the first switching element and another connection point between the second winding of the second transformer and the fourth main electrode of the second switching element.

2. The direct-current converter of claim 1, further comprising a series resonant circuit where the primary winding of the first transformer and a capacitor are connected to each other in series, wherein
the series resonant circuit is interposed between the connection point between the first winding of the second transformer and the second main electrode of the first switching element and the connection point between the second winding of the second transformer and the fourth main electrode of the second switching element.

3. The direct-current converter of claim 1, further comprising a series resonant circuit where a resonant capacitor, a resonant inductance and the primary winding of the first transformer are connected to each other in series, wherein
the series resonant circuit is interposed between the connection point between the first winding of the second transformer and the second main electrode of the first switching element and the connection point between the second winding of the second transformer and the fourth main electrode of the second switching element.

4. The direct-current converter of claim 3, wherein the resonant inductance consists of a leakage inductance between the primary winding of the first transformer and the secondary winding of the first transformer.

5. The direct-current converter of claim 1, wherein the first winding of the second transformer and the second winding of the second transformer are wound so as to have reverse polarities to each other.

6. The direct-current converter of claim 2, wherein the first winding of the second transformer and the second winding of the second transformer are wound so as to have reverse polarities to each other.

7. The direct-current converter of claim 3, wherein the first winding of the second transformer and the second winding of the second transformer are wound so as to have reverse polarities to each other.

8. The direct-current converter of claim 1, further comprising a control circuit that alternately turns on and off the first switching element and the second switching element by varying an oscillation frequency based on an output voltage of the rectification smoothing circuit.

9. The direct-current converter of claim 2, further comprising a control circuit that alternately turns on and off the first switching element and the second switching element by varying an oscillation frequency based on an output voltage of the rectification smoothing circuit.

10. The direct-current converter of claim 3, further comprising a control circuit that alternately turns on and off the first switching element and the second switching element by varying an oscillation frequency based on an output voltage of the rectification smoothing circuit.

* * * * *